UNITED STATES PATENT OFFICE.

WILLIAM R. WALKER, OF NEW YORK, N. Y.

MANUFACTURE OF STEEL.

934,247. Specification of Letters Patent. Patented Sept. 14, 1909.

No Drawing. Application filed April 20, 1906, Serial No. 312,793. Renewed February 16, 1909. Serial No. 478,335.

*To all whom it may concern:*

Be it known that I, WILLIAM R. WALKER, of New York city, in the State of New York, have invented a new and useful Improvement in the Manufacture of Steel, of which the following is a specification.

In the practice of my invention, I treat molten pig iron in an acid lined Bessemer converter in the ordinary way until it has been substantially desiliconized and until the carbon has been removed to or somewhat above the limits ordinarily obtained in the use of the Bessemer converter, enough carbon being left remaining (preferably from .04 per-cent. to .3 per cent. or thereabout) to prevent an oxidized condition of the metal and to enable the metal to remain sufficiently fluid to permit its ready transfer from the converter. I then take this desiliconized and nearly decarburized metal and—either directly or through an intermediate mixer—introduce it into an electrical furnace having its conductors or electrodes so applied as to heat the bath. The electrical furnace has a basic lining, and I add to the metal therein iron oxid together with burnt lime or limestone, which additions may be made either before or after the metal has been introduced, or the burnt lime may be partly supplied from the lining of the furnace. The reaction caused by the basic additions, together with the continued heating is to dephosphorize and desulfurize the metal, the phosphorus passing into and becoming combined with the resulting slag, which may be removed during the treatment or may be retained in the furnace till the end of the heat. When the phosphorus has been eliminated, and the metal has attained the required heat, it is tapped from the furnace and cast into ingots or otherwise treated as desired, and while it is in the furnace, or after its removal therefrom, I may add silicon, manganese, vanadium, nickel or other elements required to modify the character of the resulting steel. This process enables me to improve the product of the Bessemer converter in such manner as to obtain steel of the quality produced from the open-hearth furnace or by the crucible process, and enables me to employ for the Bessemer converter iron containing more phosphorus than is permissible in so-called Bessemer iron, for the acid Bessemer process does not remove phosphorus, and any phosphorus contained in the pig iron charged into the converter will appear in the resulting steel. In my process the phosphorus remaining after the treatment in the converter is eliminated to the desired extent in the electric furnace.

The desiliconizing of the metal in the Bessemer converter is an important advantage, because the destructive effect of the metal on the basic lining of the electric furnace is thus reduced to a minimum.

My process is materially better than other electric furnace processes heretofore devised for the manufacture of steel, because the employment of the Bessemer converter for effecting the preliminary treatment of the iron largely economizes the electrical energy which it is necessary to employ.

The construction of the apparatus and the steps of the process may be modified in various ways by those skilled in the art without departing from my invention as stated in the claims. Thus, the electric furnace may be a stationary furnace approximately of the form of the ordinary open-hearth furnace, or it may be a portable furnace or a rolling or tipping furnace, or it may be in the form of a covered ladle provided with suitable electrodes or electrical conductors for effecting the heating of the metal. Such electrical furnaces enable me to finish the treatment of the metal without subjecting it to an oxidizing atmosphere.

I claim:

1. An improvement in the art of making steel which consists in treating molten iron in an acid-lined Bessemer converter for the removal of silicon and carbon; then, after the substantial elimination of silicon and before the entire elimination of carbon, transferring the metal to a basic-lined electric furnace having a non-oxidizing atmosphere and treating it therein for the removal of phosphorus 2. An improvement in the art of making steel which consists in treating molten iron in an acid-lined Bessemer converter for the removal of silicon and carbon; then, after the substantial elimination of silicon and when the carbon is reduced to about three-tenths of one per cent., transferring the metal to a basic-lined electric furnace having a non-oxidizing atmosphere and treating it therein for the removal of phosphorus.

In testimony whereof, I have hereunto set my hand.

WILLIAM R. WALKER.

Witnesses:
 ALFRED D. WATERMAN,
 GEORGE H. SONNEBORN.